UNITED STATES PATENT OFFICE.

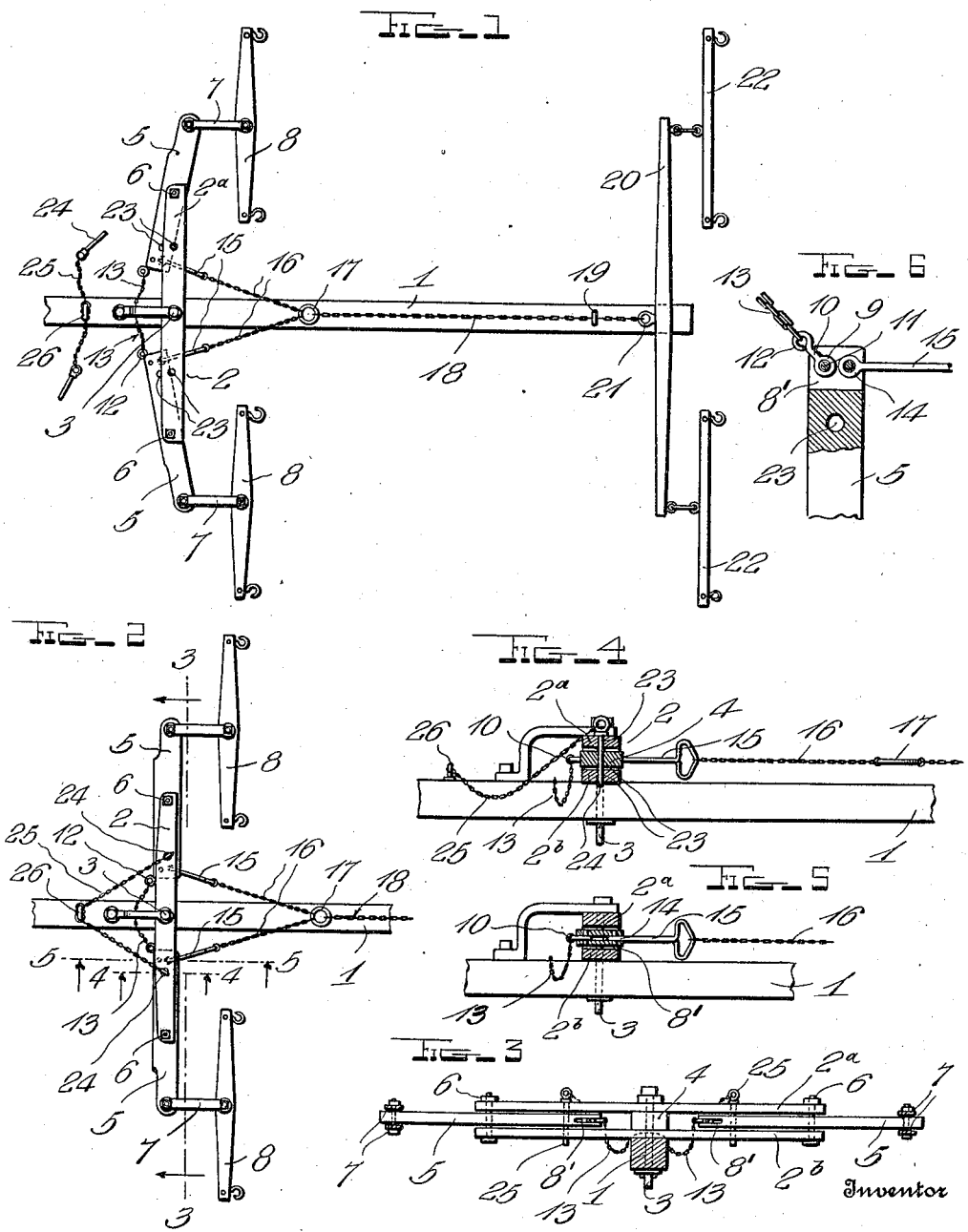

MADS ANDERSEN CHRISTENSEN, OF PRESTON, IDAHO.

DRAFT-EQUALIZER.

1,179,610.    Specification of Letters Patent.    Patented Apr. 18, 1916.

Application filed August 12, 1915. Serial No. 45,183.

*To all whom it may concern:*

Be it known that I, MADS ANDERSEN CHRISTENSEN, a subject of Denmark, residing at Preston, in the county of Franklin and State of Idaho, have invented certain new and useful Improvements in Draft-Equalizers; and I do declare the following to be a full, clear, and exact description of the invention, such as will enable others skilled in the art to which it appertains to make and use the same.

My invention relates to useful improvements in draft devices, and more particularly to those designed for equalizing the pull of two teams of draft animals hinged in tandem.

One object of the invention is to provide a device of this class which although being extremely simple and therefore comparatively inexpensive, will be efficient and durable.

Another object is to provide simple means whereby three trees with which the device is provided, may be locked together to become in effect a double-tree.

With these general objects in view, the invention resides in certain novel features of construction and in unique combinations of parts to be hereinafter fully described and claimed.

In describing the invention, I shall refer to the accompanying drawing which constitutes a part of the application and in which, Figure 1 is a top plan view of a draft equalizer constructed in accordance with my invention, showing the application thereof to use; Fig. 2 is a fragmentary plan view showing a trio of trees to be described locked together to constitute one rigid tree; Fig. 3 is a vertical transverse section as viewed along the plane indicated by the line 3—3 of Fig. 2; Figs. 4 and 5 are vertical longitudinal sections as seen respectively on the lines 4—4 and 5—5 of Fig. 2; Fig. 6 is a detail horizontal section through the inner end of one of the supplemental trees.

In referring to this drawing, corresponding reference characters designate the same parts throughout the several views, the numeral 1 indicating a tongue to which, near the rear end thereof, a main tree 2 is pivoted at its center upon an upright king-bolt 3. The tree 2 comprises upper and lower bars $2^a$ and $2^b$ which are spaced from each other by a suitable spacing block 4 through which the king-bolt 3 passes.

Disposed between the opposite ends of the upper and lower bars $2^a$ and $2^b$ is a pair of supplemental trees 5 which are pivoted between their ends upon upright bolts or the like 6 passing through the centers thereof and through the ends of the aforesaid bars. The outer ends of the trees 5 are connected by links or other appropriate means 7 with a pair of swingle trees 8, while the inner ends of said trees 5 are slit horizontally as disclosed at 8′, such slits receiving therein eyes 9 at one end of links 10, rivets or the like 11 being passed through the trees and through said eyes, the other end of said links being provided with additional eyes 12 which are here shown as loosely connected by a chain 13 which passes above the tongue 1 in rear of the main tree 2, whereby to prevent excessive turning of the trees 5 around the pivots 6.

Likewise disposed in the slits 8′ are eyes 14 on the rear ends of a pair of forwardly converging links 15, the front ends of said links being formed with vertically elongated loops connected to the rear ends of a pair of chains or other appropriate cable members 16 which lead forwardly and are connected by a ring or the like 17 to a single pull chain or other appropriate cable member 18, the latter being positioned above the tongue 1 and having its front end portion passed through an eye or other suitable guide 19 carried by said tongue near the front end thereof.

It is to be observed that the vertically elongated loops on the front ends of the links 15 are disposed for contact with the front edges of the bars $2^a$ and $2^b$. This contact takes place at the same time as tightening of the chain 13, whereby should all of the load be placed on the two rear draft animals, the loops in question and said chain will prevent rearward movement of the inner ends of the supplemental trees 5, while said animals pull forwardly on the outer ends thereof. This is of great advantage, since the front team of horses is often unhitched after assisting in pulling a load for a certain distance.

The chain 18 is connected at its front end to a double-tree 20, preferably through the instrumentality of an eye 21, the opposite ends of said double-tree being provided with swingle trees 22. Thus it will be seen that if the front team tends to lag behind, the rear team in pulling forwardly upon the swingle trees 8, will so rock the supplemental trees 5 as to tighten the chains 16 and 18, thus equalizing the power on the two teams, whereas any tendency on the front team to pull with more force than the rear team, is prevented and the strain is likewise equalized. Furthermore, the pull of the animals of each team will be evened since the main tree 2 and the double-tree 20 are allowed to swing freely respectively around the bolt 3 and the guide 19.

At times, it becomes expedient to provide means whereby the trees 5 and 2 may be locked together, whereby such trees will in effect become one rigid double-tree having swingle trees 8 at its opposite ends. For this purpose, the inner ends of the trees 5 and adjacent portions of the bars 2ª and 2ᵇ of the tree 2, are provided with openings 23 which may be alined vertically for the reception of a pair of pins 24, such pins being normally carried by a chain or the like 25 which is secured at 26 to the tongue 1. By the insertion of these pins into the openings 23, the effect desired is produced, (see Fig. 2).

It often occurs that when only the rear team is to be used, it is not convenient to immediately insert the pins 25 through the openings 23. If this be the case, the loops on the ends of the links 15, and chain 13 will suffice until it is possible to insert such chains.

From the foregoing description, taken in connection with the accompanying drawing, it will be evident that although the invention is simple and inexpensive, it will be highly efficient and durable and will possess a number of advantages.

In the drawing, certain specific details of construction have been shown for accomplishing probably the best results, and in the preceding paragraphs such details have been described, but it will be evident that I need not be restricted thereto otherwise than to the extent to which the appended claim limits me.

I claim:—

In combination, a draft tongue, a doubletree fulcrumed between its ends thereto, a pair of equalizing trees fulcrumed between their ends to the ends of said doubletree, swingletrees connected to the outer ends of said equalizing trees, a draft member in advance of the aforesaid trees and connected with the inner ends of said equalizing trees, the latter and the doubletree being formed with openings capable of vertical alinement, said openings being spaced in opposite directions from the fulcrum of the doubletree, a pair of pins insertible through said openings when alined to lock the equalizing trees to the doubletree, and a pair of normally slack chains connected to and converging from the pins, said chains being anchored to the tongue, whereby to prevent loss of the pins when the latter are not in use and to limit the movement of the doubletree when said pins are inserted through the aforesaid openings.

In testimony whereof I have hereunto set my hand in presence of two subscribing witnesses.

MADS ANDERSEN CHRISTENSEN.

Witnesses:
A. D. ERICKSEN.
C. M. CONDIE.

Copies of this patent may be obtained for five cents each, by addressing the "Commissioner of Patents, Washington, D. C."